United States Patent
Maki et al.

(10) Patent No.: US 9,821,858 B2
(45) Date of Patent: Nov. 21, 2017

(54) AL-PLATED STEEL SHEET, METHOD FOR HOT-PRESSING AL-PLATED STEEL SHEET, AND AUTOMOTIVE PART

(71) Applicant: NIPPON STEEL & SUMITOMO METAL CORPORATION, Tokyo (JP)

(72) Inventors: Jun Maki, Tokyo (JP); Masao Kurosaki, Tokyo (JP); Kazuhisa Kusumi, Tokyo (JP); Shintaro Yamanaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/382,085

(22) PCT Filed: Apr. 15, 2013

(86) PCT No.: PCT/JP2013/061206
§ 371 (c)(1),
(2) Date: Aug. 29, 2014

(87) PCT Pub. No.: WO2013/157522
PCT Pub. Date: Oct. 24, 2013

(65) Prior Publication Data
US 2015/0044499 A1 Feb. 12, 2015

(30) Foreign Application Priority Data
Apr. 18, 2012 (JP) ................ 2012-095014
Apr. 25, 2012 (JP) ................ 2012-100266

(51) Int. Cl.
*B62D 29/00* (2006.01)
*B21D 35/00* (2006.01)
(Continued)

(52) U.S. Cl.
CPC ......... *B62D 29/007* (2013.01); *B21D 22/022* (2013.01); *B21D 37/16* (2013.01);
(Continued)

(58) Field of Classification Search
None
See application file for complete search history.

(56) References Cited

U.S. PATENT DOCUMENTS 6,296,805 B1   10/2001   Laurent et al.
8,986,849 B2 *  3/2015   Maki .................... C21D 1/673
                                                  428/457
(Continued)

FOREIGN PATENT DOCUMENTS

CN   100434564 C   11/2008
CN   102066615 A    5/2011
(Continued)

OTHER PUBLICATIONS

JP2002-006399A-MT. Jan. 9, 2002.*
(Continued)

*Primary Examiner* — Vera Katz
(74) *Attorney, Agent, or Firm* — Birch, Stewart, Kolasch & Birch, LLP

(57) ABSTRACT

An Al-plated steel sheet includes: a steel sheet; an Al plating layer which is formed on one surface or both surfaces of the steel sheet and contains at least 85% or more of Al by mass %; and a surface coating layer which is laminated on the surface of the Al plating layer and contains ZnO and one or more lubricity improving compounds.

8 Claims, 4 Drawing Sheets

(51) Int. Cl.
*B21D 37/16* (2006.01)
*C23C 30/00* (2006.01)
*C23C 2/12* (2006.01)
*C23C 2/28* (2006.01)
*C22C 38/14* (2006.01)
*B32B 15/01* (2006.01)
*C22C 21/00* (2006.01)
*C22C 21/02* (2006.01)
*C22C 38/02* (2006.01)
*C22C 38/04* (2006.01)
*C22C 38/06* (2006.01)
*B21D 22/02* (2006.01)
*B21D 53/88* (2006.01)
*C23C 2/26* (2006.01)
*C23C 24/08* (2006.01)
*C23C 28/00* (2006.01)
*C22C 38/00* (2006.01)

(52) U.S. Cl.
CPC ............ *B21D 53/88* (2013.01); *B32B 15/012* (2013.01); *C22C 21/00* (2013.01); *C22C 21/02* (2013.01); *C22C 38/001* (2013.01); *C22C 38/02* (2013.01); *C22C 38/04* (2013.01); *C22C 38/06* (2013.01); *C22C 38/14* (2013.01); *C23C 2/12* (2013.01); *C23C 2/26* (2013.01); *C23C 2/28* (2013.01); *C23C 24/085* (2013.01); *C23C 28/321* (2013.01); *C23C 28/345* (2013.01); *C23C 30/005* (2013.01); *B21D 35/001* (2013.01); *C22C 38/00* (2013.01); *Y10T 428/12556* (2015.01); *Y10T 428/12611* (2015.01)

(56) References Cited

U.S. PATENT DOCUMENTS

| | | |
|---|---|---|
| 2004/0166360 A1 | 8/2004 | Imai et al. |
| 2011/0030441 A1 | 2/2011 | Maki et al. |
| 2012/0073351 A1* | 3/2012 | Maki .................. C23C 2/12 72/364 |
| 2015/0020562 A1* | 1/2015 | Yamanaka ............ C21D 9/00 72/46 |

FOREIGN PATENT DOCUMENTS

| | | |
|---|---|---|
| EP | 2 270 257 A1 | 1/2011 |
| EP | 2 816 139 A1 | 12/2014 |
| JP | 2000-038640 A | 2/2000 |
| JP | 2002-6399 A | 1/2002 |
| JP | 2003-129209 A | 5/2003 |
| JP | 2004-211151 A | 7/2004 |
| RU | 2198244 C2 | 2/2003 |
| WO | WO 2009/131233 A1 | 10/2009 |
| WO | WO 2012/018014 A1 | 2/2012 |

OTHER PUBLICATIONS

International Search Report issued in PCT/JP2013/061206 dated Jun. 11, 2013.
Russian Office Action dated Dec. 23, 2015, issued in Russian Patent Application No. 2014139439 (English translation).
Extended European Search Report, dated Dec. 10, 2015, for European Application No. 13777775.1.
Chinese Office Action and Search Report, dated Jul. 16, 2015, for Chinese Application No. 201380017332.4, along with English translations.

* cited by examiner

AL-PLATED STEEL SHEET, METHOD FOR HOT-PRESSING AL-PLATED STEEL SHEET, AND AUTOMOTIVE PART

TECHNICAL FIELD OF THE INVENTION

The present invention relates to an Al-plated steel sheet, a method for hot-pressing an Al-plated steel sheet, and an automotive part.

Priority is claimed on Japanese Patent Application No. 2012-095014, filed on Apr. 18, 2012 and Japanese Patent Application No. 2012-100266, filed on Apr. 25, 2012, the contents of which are incorporated herein by reference.

RELATED ART

In recent years, there have been increasing demands for cutbacks on chemical fuel consumption in order to protect the environment and prevent global warming, and these demands have had various effects on the manufacturing industry. For example, even the automobile, an indispensable means of transportation in daily life and activities, is no exception, and improved fuel efficiency and the like through vehicle body weight reduction and other means are required. In the case of automobiles, however, mere realization of vehicle body weight reduction is not acceptable from the viewpoint of product quality, and adequate safety also has to be secured.

The components of an automobile are formed largely of steel, particularly a steel sheet, and reducing the weight of the steel sheet is important for vehicle body weight reduction. As just pointed out, however, mere reduction of steel sheet weight is not acceptable since the mechanical strength of the steel sheet has to be secured. Such demands for the steel sheet are not limited to the auto-making industry but also applied similarly to various other manufacturing industries.

Research and development has therefore been conducted with regard to the steel sheet that, by improving the mechanical strength of the steel sheet, is capable of maintaining or increasing mechanical strength even when made thinner than the steel sheet used heretofore.

Generally, a material having high mechanical strength tends to deteriorate in shape fixability in bending and other forming, so that the working itself becomes difficult in the case of formation into a complicated shape. One means available for overcoming this formability problem is the so-called "hot pressing method" (also referred to as a hot-stamping method, a hot press method, a die-quenching method, or press-hardening).

In the hot pressing method, the material to be formed is heated once to a high temperature, softened, pressed and then cooled. Since the hot pressing method softens the material by heating the steel once to a high temperature, the material can be easily pressed, while, in addition, the mechanical strength of the material can be increased by the quenching through the cooling after the forming. The hot pressing method therefore makes it possible to obtain a formed product that simultaneously achieves satisfactory shape fixability and high mechanical strength.

However, when the hot pressing method is applied to a steel sheet, the heating to a high temperature of, for example, 800° C. or higher oxidizes iron and the like on the surface, thereby producing scale (oxide). Accordingly, a process of removing the scale (a descaling process) is therefore required after conducting the hot pressing, which decreases productivity. In addition, in the case of a member which requires corrosion resistance, it is necessary to corrosion-proof or metal clad the member surface after working, which makes a surface cleaning process and a surface treating process necessary and also decreases productivity.

As a method for suppressing such a decrease in productivity, a method of providing coating on the steel sheet in advance is used. Generally, various materials such as organic materials and inorganic materials are used as a material for coating the steel sheet. Among the materials, a steel sheet having a zinc (Zn)-based plating that provides the steel sheet with a sacrificial protection effect is widely used for automotive steel sheets and the like, from the viewpoints of anticorrosion performance and steel sheet production technology.

However, a heating temperature (700° C. to 1000° C.) in the hot pressing is higher than decomposition temperatures of organic materials or melting points of metal materials such as a Zn-based material, and a plating layer of the surface is melted and evaporated during heating. Thus, the surface properties deteriorate significantly in some cases.

Accordingly, as a steel sheet which is hot-pressed, for example, a steel sheet having an aluminum (Al)-based metal coating, which has a higher melting point than that of an organic material coating or a Zn-based metal coating, that is, a so-called Al-plated steel sheet is desirably used.

An Al-based metal coating of the steel sheet prevents scale from being generated on the surface of the steel sheet and improves productivity by making a descaling or other such process unnecessary. In addition, Al-based metal coating has a corrosion resistance effect and thus, post-painting corrosion resistance is improved.

Patent Document 1 describes a method which performs hot pressing using an Al-plated steel sheet, obtained by coating a steel sheet having a predetermined component composition with an Al-based metal coating.

However, when the steel sheet is coated with an Al-based metal, depending on heating conditions before hot pressing, the Al-based metal coating melts, and is changed to an Al—Fe compound by the combination of iron (Fe) diffusing from the steel sheet and aluminum, and the Al—Fe compound (hereinafter, also referred to as an "Al—Fe alloy layer") is laminated on the surface of the steel sheet in some cases. Since the Al—Fe alloy layer is hard, the Al—Fe alloy layer is brought into contact with a die, and thus, processing scratches may be generated on the surface of the steel sheet during pressing in some cases.

The surface of the Al—Fe alloy layer is by nature relatively resistant to slipping and poor in lubricity. In addition, the Al—Fe alloy layer is hard and thus relatively susceptible to cracking, so that formability may decrease owing to cracking, powdering and the like of the plating layer. Moreover, when the Al—Fe alloy powder exfoliated from the Al—Fe alloy layer adheres to the die, the quality of the pressed-formed product is degraded. In addition, when the surface of the Al—Fe alloy layer is strongly scratched and the Al—Fe alloy powder adheres to the die, the quality of the pressed-formed product is degraded.

Therefore, it is necessary to remove the Al—Fe alloy powder adhering to the die during repair, which decreases productivity and increases costs.

In addition, since the Al—Fe compound is low in reactivity in phosphate treatment, a coating (a phosphate coating) is not formed in chemical conversion, which is an electrocoating pretreatment. The Al—Fe alloy layer has satisfactory coating adhesion even without formation of the chemical conversion coating, and as long as a deposition amount of the Al—Fe alloy layer is sufficient, post-painting corrosion resistance also becomes satisfactory. However, when the deposition amount of the Al—Fe alloy layer is increased, the aforementioned die adhesion is caused.

As described above, the die adhesion is sometimes caused by exfoliation of the Al—Fe alloy layer, surface scratches of the Al—Fe alloy layer, and the like. Although the latter die adhesion (scratch adhesion) is improved by improving the lubricity of the surface coating, the former die adhesion (exfoliation adhesion) is relatively slightly improved. The most effective way to improve the former die adhesion is reduction of the deposition amount of the Al—Fe alloy layer. However, when the deposition amount of the Al—Fe alloy layer is reduced, the corrosion resistance deteriorates.

In contrast, in Patent Document 2, for the purpose of preventing processing scratches, it is disclosed that a steel sheet having a predetermined component composition is coated with an Al-based metal coating, and an inorganic compound coating including at least one of silicon (Si), zirconium (Zr), titanium (Ti), and phosphorus (P), an organic compound coating, or a complex compound coating thereof is further formed on the Al-based metal coating.

With the steel sheet on which such a surface coating is formed, the surface coating remains during the pressing after heating, so that formation of processing scratches during the pressing can be prevented. In Patent Document 2, it is disclosed that since the surface coating functions as a lubricant during the pressing, formability is improved. However, actually, sufficient lubricity cannot be obtained and another lubricant or alternative means is required.

In Patent Document 3, a method for solving a problem of surface deterioration by evaporation of a galvanized layer in hot pressing of the galvanized steel sheet is disclosed. Specifically, a zinc oxide (ZnO) layer having a high melting point is formed on the surface of the galvanized layer to function as a barrier layer for preventing the evaporation of the underlying galvanized layer.

However, the technique in Patent Document 3 assumes a galvanized layer. The amount of Al in the galvanized layer is allowable up to 0.4%. However, a lower Al concentration is preferable and actually, the technique is a technique not essentially assumed on Al-based metal coating. Since a problem of Patent Document 3 is Zn evaporation of the galvanized layer, naturally, the above problem cannot arise in the case of the Al-based metal coating having a high melting point.

In Patent Document 4, a technique of coating a surface of an Al-plated steel sheet with a Wurtzite-type compound to improve hot lubricity and chemical conversion properties is disclosed. This technique is effective in improving lubricity and also improves post-painting corrosion resistance. However, in order to improve lubricity, the necessary deposition amount of the coating is about 2 g/m$^2$ in terms of Zn, and in order to obtain more stable lubricity, the necessary deposition amount thereof is about 3 g/m$^2$. However, when the deposition amount of the coating of 3 g/m$^2$ is converted into the thickness of the coating, the thickness is about 1.5 µm. With such the thickness of the coating (when the deposition amount of the coating is more than 3 g/m$^2$), the coating resistance increases and spot weldability deteriorates. As a result, there is a concern of deterioration in cross tensile strength. Therefore, there have been demands for a technique of improving lubricity with a smaller deposition amount of the coating.

PRIOR ART DOCUMENT

Patent Document

[Patent Document 1] Japanese Unexamined Patent Application, First Publication No. 2000-38640
[Patent Document 2] Japanese Unexamined Patent Application, First Publication No. 2004-211151
[Patent Document 3] Japanese Unexamined Patent Application, First Publication No. 2003-129209
[Patent Document 4] PCT International Publication No. WO2009/131233

DISCLOSURE OF THE INVENTION

Problems to be Solved by the Invention

As described above, a plated steel sheet provided with Al-based plating having a high melting point (an Al-plated steel sheet) is expected to be used as an automotive steel sheet which requires corrosion resistance, and various suggestions have been made for application to hot pressing. However, in a conventional Al-plated steel sheet, satisfactory lubricity of an Al—Fe alloy layer formed on the surface thereof was not able to be obtained. Thus, press formability was poor during hot pressing and the steel sheet was not easily applied to hot pressing into a complicated shape.

The present invention has been made in consideration of the aforementioned circumstances, and an object thereof is to provide an Al-plated steel sheet having more satisfactory lubricity than the conventional one, and capable of improving formability during hot pressing and productivity, a method for hot-pressing the Al-plated steel sheet, and an automotive part produced by the hot pressing method.

Measures for Solving the Problem

The present invention adopts the following measures to solve the above problems and achieve the object.

(1) An Al-plated steel sheet according to an aspect of the present invention includes: a steel sheet; an Al plating layer which is formed on one surface or both surfaces of the steel sheet and contains at least 85% or more of Al by mass %; and a surface coating layer which is laminated on the surface of the Al plating layer and contains ZnO and one or more lubricity improving compounds.

(2) In the Al-plated steel sheet according to (1), the lubricity improving compound may be a compound including one or more transition metal elements.

(3) In the Al-plated steel sheet according to (2), the transition metal element may be any one or more of Ti, V, Cr, Mn, Fe, Co, Ni, Cu, Zr, Mo, W, La, and Ce.

(4) In the Al-plated steel sheet according to (2), an amount of the lubricity improving compound including the transition metal element in the surface coating layer may be 1% to 40% with respect to a total amount of ZnO by mass ratio.

(5) In the Al-plated steel sheet according to (1), the lubricity improving compound may be a compound including one or more typical elements.

(6) In the Al-plated steel sheet according to (5), the typical element may be any one or more of Mg, Ca, Sr, Ba, P, Sn, and Ge.

(7) In the Al-plated steel sheet according to (5), an amount of the lubricity improving compound including the typical element in the surface coating layer may be 5% to 30% with respect to a total amount of ZnO by mass ratio.

(8) In the Al-plated steel sheet according to any one of (1) to (7), the surface coating layer may contain 0.3 g/m² to 7 g/m² of ZnO in terms of Zn.

(9) In the Al-plated steel sheet according to any one of (1) to (8), the surface coating layer may further contain 5% to 30% of an organic compound with respect to the total amount of ZnO by mass ratio.

(10) A method for hot-pressing an Al-plated steel sheet according to another aspect of the present invention includes blanking and then heating the Al-plated steel sheet according to any one of (1) to (9), and press-forming the steel sheet.

(11) In the method for hot-pressing an Al-plated steel sheet according to (10), an average temperature rising rate until the temperature of the Al-plated steel sheet reaches from 50° C. to a temperature 10° C. lower than a maximum reaching temperature may be 10° C./sec to 300° C./sec in the heating before the press-forming of the steel sheet.

(12) In the method for hot-pressing an Al-plated steel sheet according to (11), the heating before the press-forming of the steel sheet may be performed by electrical heating or induction heating.

(13) An automotive part according to still another aspect of the present invention is produced by the method for hot-pressing an Al-plated steel sheet according to any one of (10) to (12).

Effects of the Invention

According to the present invention, it is possible to provide an Al-plated steel sheet which has more satisfactory lubricity than that of the conventional one and is capable of improving formability and productivity during hot pressing, a method for hot-pressing the Al-plated steel sheet, and an automotive part produced by the hot pressing method.

EMBODIMENTS OF THE INVENTION

Hereinafter, an embodiment of the present invention will be described in detail with reference to drawings.

First Embodiment

Figure 1A:
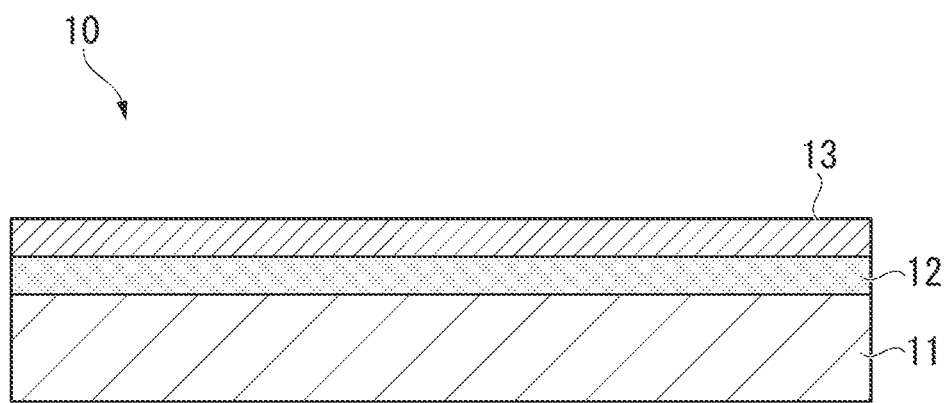
FIG. 1A is a layer structure view of an Al-plated steel sheet according to a first embodiment of the present invention.

First, a first embodiment of the present invention will be described. FIG. 1A is a view showing a layer structure of an Al-plated steel sheet 10 according to the first embodiment. As shown in FIG. 1A, the Al-plated steel sheet 10 according to the first embodiment includes a steel sheet 11, an Al plating layer 12 which is formed on one surface (for example, an upper surface) of the steel sheet 11, and a surface coating layer 13 which is formed on the surface of the Al plating layer 12.

In FIG. 1A, an example of a case in which the Al plating layer 12 and the surface coating layer 13 are formed on the one surface of the steel sheet 11 is shown. However, the Al plating layer 12 and the surface coating layer 13 may be formed on both surfaces of the steel sheet 11.

The steel sheet 11 is a substrate of the Al-plated steel sheet 10 and has required mechanical properties (tensile strength, yield point, elongation, reduction, hardness, impact value, fatigue strength, creep strength, and other such properties related to mechanical deformation and fracture). For example, the steel sheet 11 contains, by mass %, 0.1% to 0.4% of carbon (C), 0.01% to 0.6% of silicon (S), 0.5% to 3% of manganese (Mn), 0.01% to 0.1% of titanium (Ti), 0.0001% to 0.1% of boron (B), and a balance consisting of iron (Fe) and unavoidable impurities.

Hereinafter, the role of each of the aforementioned elements contained in the steel sheet 11 will be described. In the following description, "%" refers to mass %.

Carbon is an element for securing the mechanical strength of the steel sheet 11. When the carbon content in the steel sheet 11 is less than 0.1%, sufficient mechanical strength cannot be obtained. On the other hand, when the carbon content in the steel sheet 11 is more than 0.4%, the hardness (mechanical strength) of the steel sheet 11 increases, but melting cracks are easily generated in the steel sheet 11. Accordingly, the carbon content in the steel sheet 11 is desirably 0.1% to 0.4%.

Silicon is an element for securing the mechanical strength of the steel sheet 11, similar to carbon. When the silicon content in the steel sheet 11 is less than 0.01%, a strength improving effect cannot be exhibited and sufficient mechanical strength cannot be obtained. On the other hand, silicon is also an easily oxidizable element, and thus, when the silicon content in the steel sheet 11 is more than 0.6%, wettability deteriorates during hot-dip plating of the steel sheet 11 and unplating occurs. Accordingly, the silicon content in the steel sheet 11 is desirably 0.01% to 0.6%.

Manganese is an element for increasing the hardenability of the steel sheet 11 to increase the strength of the steel sheet 11. In addition, manganese combines with sulfur (S) which is an unavoidable impurity in the steel sheet 11 to form manganese sulfide (MnS) and prevents hot embrittlement of the steel sheet 11 by sulfur. When the manganese content in the steel sheet 11 is less than 0.5%, the addition effect is not exhibited. On the other hand, when the manganese content in the steel sheet 11 is more than 3%, the residual γ phase in the steel sheet 11 increases and the strength decreases. Accordingly, the manganese content in the steel sheet 11 is desirably 0.5% to 3%.

Titanium is a strength improving element and also an element for improving the heat resistance of the Al plating layer 12. When the titanium content in the steel sheet 11 is less than 0.01%, a strength improving effect and heat resistance improving effect cannot be obtained. On the other hand, when the titanium content in the steel sheet 11 is more than 0.1%, for example, carbides and nitrides are formed and the steel sheet 11 is likely to be softened. Thus, the desired mechanical strength cannot be obtained. Accordingly, the titanium content in the steel sheet 11 is desirably 0.01% to 0.1%.

Boron is an element for increasing the hardenability of the steel sheet 11 to improve the strength of the steel sheet 11. When the boron content in the steel sheet 11 is less than 0.0001%, a strength improving effect cannot be exhibited. On the other hand, when the boron content in the steel sheet 11 is more than 0.1%, the fatigue strength of the steel sheet 11 decreases owing to formation of inclusions. Accordingly, the boron content in the steel sheet 11 is desirably 0.0001% to 0.1%.

The steel sheet 11 may contain unavoidable impurities mixed in other production processes within a range not impairing the mechanical strength of the steel sheet 11.

In the steel sheet 11 having the above component composition, the mechanical strength is increased to about 1500 MPa or more by quenching in the hot pressing method. In the hot pressing method, since the steel sheet 11 is press-formed in a state in which the steel sheet is softened, forming is easy. In addition, when the steel sheet 11 is made thin to reduce the weight, high mechanical strength is maintained.

The Al plating layer 12 is formed on one surface (for example, an upper surface) of the steel sheet 11 and contains at least 85% or more of aluminum (Al) by mass %. For example, the Al plating layer 12 is desirably formed by a hot-dip plating method. However, the forming method thereof is not limited to the hot-dip plating method.

As described above, the Al plating layer 12 preferably contains 85% or more of aluminum and may contain components other than aluminum. Components other than aluminum are not particularly limited, but silicon is preferable for the following reasons.

Silicon is an element having a function of suppressing formation of an alloy layer of iron and aluminum (hereinafter, referred to as a Fe—Al alloy layer) during the hot-dip plating of the steel sheet 11. When the silicon content of the Al plating layer 12 is less than 3%, the Fe—Al alloy layer grows thickly during the hot-dip plating of the steel sheet 11, and thus, cracking of the plating layer is facilitated during the process and corrosion resistance may deteriorate. On the other hand, when the silicon content of the Al plating layer 12 is more than 15%, the workability and the corrosion resistance of the Al plating layer 12 deteriorate. Thus, the silicon content of the Al plating layer 12 is desirably 3% to 15%.

The Al plating layer 12 having the above component composition has a function of preventing corrosion of the steel sheet 11 and preventing scales (oxides of iron) from being formed on the surface of the steel sheet 11 due to heating before hot pressing.

Accordingly, a scale removing process, a surface cleaning process, a surface treating process, and the like can be omitted by forming the Al plating layer 12 on the steel sheet 11, and thus, the productivity of the Al-plated steel sheet 10 is improved. In addition, the Al plating layer 12 has a higher melting point than those of coatings made of organic materials and coatings made of other metal materials (for example, Zn-based material) and thus can be processed at a high temperature during hot pressing.

Some of aluminum contained in the Al plating layer 12 is alloyed with iron in the steel sheet 11 during the hot-dip plating or the hot pressing. Accordingly, the Al plating layer 12 is not necessarily formed with a single layer with a fixed component composition and may include a partially alloyed layer (an alloy layer).

Further, when the deposition amount of the Al plating layer 12 with respect to the steel sheet 11 is 80 g/m$^2$ per surface, the thickness of the Al plating layer 12 per surface is about 15 μm.

The surface coating layer 13 is laminated on the surface of the Al plating layer 12 and contains at least zinc oxide (ZnO). For example, the surface coating layer 13 is formed by applying a solution in which fine zinc oxide particles are suspended to the surface of the Al plating layer 12 by a roll coater or the like. The surface coating layer 13 has an effect of improving lubricity during the hot pressing of the Al-plated steel sheet 10 and reactivity with a chemical conversion solution.

The surface coating layer 13 further contains one or more lubricity improving compounds, in addition to the aforementioned zinc oxide. The lubricity improving compound is preferably a compound including one or more transition metal elements (elements belonging to the third group to the eleventh group in the periodic table).

Further, the aforementioned transition metal element is preferably any one or more of titanium (Ti), vanadium (V), chromic (Cr), manganese (Mn), iron (Fe), cobalt (Co), nickel (Ni), copper (Cu), zirconium (Zr), molybdenum (Mo), tungsten (W), lanthanum (La) and cerium (Ce).

Particularly, a compound including any one or more of nickel, titanium, zirconium, manganese, and copper has a remarkable lubricity improving effect. Compounds of these elements are preferably oxides, nitrides, sulfides, or phosphates.

Although the reason why the compound of the aforementioned transition metal element contributes to improving lubricity during the hot pressing is not clear, it is considered that the lubricity improving effect cannot be obtained only with the compound of the aforementioned transition metal element, and thus, the lubricity is improved due to a composite effect or by a synergistic effect with zinc oxide.

While zinc oxide has the aforementioned lubricity improving effect essentially, with the addition of the compound of the transition metal element, zinc oxide and the compound of the aforementioned transition metal element are reacted with each other during hot pressing to form a composite oxide. As a result, it is assumed that lubricity is improved.

For example, the surface coating layer 13 containing zinc oxide and the compound of the aforementioned transition metal element (lubricity improving compound) is formed on the surface of the Al plating layer 12 by applying a coating containing zinc oxide and the lubricity improving compound to the surface of the Al plating layer, and baking and drying the coating after the applying of the coating.

As a method for applying zinc oxide and the lubricity improving compound, for example, a method of forming a coating by mixing a suspension containing zinc oxide and the lubricity improving compound containing the transition metal element with an organic binder, and applying the coating to the surface of the Al plating layer 12, and a method of application by powder coating can be used.

As the lubricity improving compound containing the aforementioned transition metal element, for example, nickel sulfate, manganese sulfate, titanium fluoride, zirconium nitrate, copper sulfate, or the like is preferably used. As the organic binder, for example, polyurethane resins, polyester resins, acrylic resins, silane coupling agents, or the like are preferably used.

The aforementioned lubricity improving compound and organic binder are preferably aqueous to be mixed with the suspension containing zinc oxide respectively. In this manner, the coating obtained by mixing the suspension containing zinc oxide and the lubricity improving compound and the organic binder is applied to the surface of the Al-plated steel sheet 12.

The particle size of zinc oxide is not particularly limited and the diameter thereof is desirably 50 nm to 1000 nm. The particle size of zinc oxide is a particle size after heat treatment is performed. Specifically, the particle size of zinc oxide is determined by observing the zinc oxide with a SEM or the like after zinc oxide is retained in a furnace at 900° C. for 5 minutes to 6 minutes and rapidly cooled with a die.

In the surface coating layer 13, the amount of the lubricity improving compound containing the transition metal element is preferably 0.5% to 50% with respect to a total amount of zinc oxide by mass ratio. When the amount of the lubricity improving compound is less than 0.5%, a sufficient lubricity improving effect cannot be obtained during the hot pressing. On the other hand, when the amount of the lubricity improving compound is more than 50%, the adhesion of the surface coating layer 13 deteriorates after heating.

The amount of the organic binder (organic compound) such as a resin component or a silane coupling agent in the surface coating layer 13 is desirably 5% to 30% with respect to the total amount of zinc oxide by mass ratio. When the amount of the organic binder is less than 5%, a sufficient binder effect cannot be obtained and the coating before heating is easily exfoliated. In order to stably obtain the binder effect, the amount of the organic binder is preferably 10% or more with respect to the total amount of zinc oxide by mass ratio. When the amount of the organic binder is more than 30%, odor emission becomes significant during heating, and thus, the amount of more than 30% is not preferable.

The present inventors have confirmed that the surface coating layer 13 according to the embodiment has higher lubricity compared to an inorganic compound coating containing at least one of silicon, zirconium, titanium, and phosphorus described in Patent Document 2, an organic compound coating, or a complex compound coating thereof. Thus, according to the Al-plated steel sheet 10 of the embodiment, more satisfactory lubricity than that of the conventional one can be achieved and improvement of formability and productivity can be realized during hot pressing.

The surface coating layer 13 preferably contains 0.3 g/m$^2$ to 7 g/m$^2$ of zinc oxide in terms of zinc.

Figure 4:
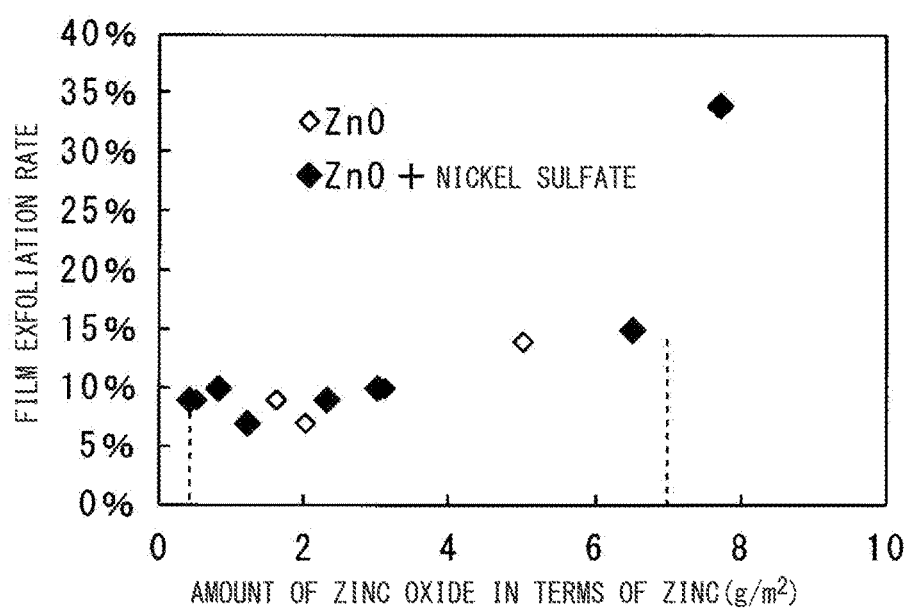
FIG. 4 is a view showing a relationship between a zinc oxide content (amount of zinc oxide in terms of Zn) of a surface coating layer and a coating exfoliation rate.

FIG. 4 is a view showing a relationship between the amount of zinc oxide (amount of zinc oxide in terms of zinc) in the surface coating layer 13 and a coating exfoliation rate. The coating exfoliation rate is a value obtained by dividing an amount of zinc exfoliated from the surface coating layer 13 by a scratch test by an amount of zinc contained in the surface coating layer 13 before the scratch test, and is used as an index for evaluating lubricity.

As shown in FIG. 4, when the amount of zinc oxide in the surface coating layer 13 is 0.3 g/m$^2$ to 7 g/m$^2$, the coating exfoliation rate is 15% or less, and the lubricity of the surface coating layer 13 is satisfactory. When the amount of the zinc oxide in the surface coating layer 13 is more than 7 g/m$^2$, the thickness of the surface coating layer 13 increases and the coating exfoliation rate rapidly increases. Thus, weldability and coating adhesion deteriorate.

Accordingly, the amount of zinc oxide in the surface coating layer 13 on one surface of the steel sheet 11 is desirably 0.3 g/m$^2$ to 7 g/m$^2$ in terms of zinc. Further, the amount of zinc oxide in the surface coating layer 13 is more desirably 0.5 g/m$^2$ to 2 g/m$^2$, and in addition to lubricity, weldability and coating adhesion become more satisfactory during hot pressing.

As a method for baking and drying the coating containing zinc oxide, the lubricity improving compound, and the organic binder after the applying of the coating, for example, a method using an hot air furnace, an induction heating furnace, a near-infrared furnace, or the like, or a method in which these furnaces are combined may be used. Depending on the type of the organic binder, instead of baking and drying after the applying of the coating, a curing method using ultraviolet rays or electron beams may be adopted. The method for forming the surface coating layer 13 is not limited to the above method and various coating forming methods can be adopted.

When the organic binder is not used, the surface coating layer 13 has slightly low adhesion with the Al plating layer 12 before heating and is partially exfoliated when being rubbed with great force. In this manner, since the surface coating layer 13 of the Al-plated steel sheet 10 exhibits satisfactory lubricity during hot pressing, the formability of the Al-plated steel sheet 10 is improved during the hot pressing and the corrosion resistance of the Al-plated steel sheet 10 after the hot pressing is also improved.

In addition, the surface coating layer 13 of the Al-plated steel sheet 10 has an effect of suppressing adhesion of the Al-plated steel sheet 10 to a die. If the Al plating layer 12 is powdered, the surface coating layer 13 containing zinc oxide on the surface prevents adhesion of powder (Al—Fe powder or the like) to the following die. Thus, a process of removing the Al—Fe alloy powder adhering to the die is not required and thus, productivity is improved.

The surface coating layer 13 functions as a protective coating for preventing scratches of the steel sheet 11 and/or the Al plating layer 12 or the like from being generating during hot pressing, and thus, the formability of the Al-plated steel sheet 10 is further improved. Further, the surface coating layer 13 has an effect of suppressing deterioration in the spot weldability of the Al-plated steel sheet 10 and the coating adhesion or the like. By forming the chemical conversion coating on the Al-plated steel sheet 10, the post-paining corrosion resistance of the Al-plated steel sheet 10 is significantly improved, and thus, the deposition amount of the surface coating layer 13 can be reduced. As a result, when the Al-plated steel sheet 10 is rapidly pressed, the adhesion of the Al—Fe alloy powder exfoliated from the Al-plated steel sheet 10 to the die is suppressed and productivity is further improved.

When the deposition amount of the surface coating layer 13 with respect to the steel sheet 11 (Al plating layer 12) is 1 g/m$^2$ in terms of Zn, the thickness of the surface coating layer 13 is about 0.5 μm.

The Al-plated steel sheet 10 of the embodiment can be processed and formed by various methods but is suitable for forming by a hot pressing method. Hereinafter, a method for hot-pressing the Al-plated steel sheet 10 in the embodiment will be described.

In the method for hot-pressing the Al-plated steel sheet 10, first, the Al-plated steel sheet 10 is blanked and then, heated and softened. The softened Al-plated steel sheet 10 is press-formed into a desired shape, and then, cooled. Since the Al-plated steel sheet 10 is softened once, the following press forming can be easily performed. Then, the Al-plated steel sheet 10 is quenched by heating and cooling to obtain a steel sheet having a high mechanical strength of 1500 MPa or more.

As a heating method in the hot pressing method, typical heating methods using an electric furnace, a radiant tube furnace, infrared rays, or the like can be adopted. When the Al-plated steel sheet 10 is heated to a melting point of aluminum or higher, the Al plating layer 12 is melted and aluminum and iron diffuse mutually to form an alloy layer of aluminum and iron (Al—Fe alloy layer) or an alloy layer of aluminum, iron, and silicon (Al—Fe—Si alloy layer). Both the Al—Fe alloy layer and Al—Fe—Si alloy layer respectively have a high melting point and the melting point is about 1150° C.

In the Al-plated steel sheet 10, plural compounds which form the Al—Fe alloy layer and the Al—Fe—Si alloy layer are present. However, these compounds change to compounds having high iron concentration by heating these compounds at a high temperature or heating these compounds for a long period of time. A final product of the Al-plated steel sheet 10 desirably has a surface state in which alloying extends to the surface and the iron concentration is not high in the alloy layer.

When aluminum which is not alloyed remains, only a portion in which aluminum remains is rapidly corroded and thus, the coating easily blisters after painting. Conversely, even when the iron concentration becomes excessively high in the Al—Fe alloy layer, the corrosion resistance of the Al—Fe alloy layer itself deteriorates, and the coating easily blisters after painting. The reason is that the corrosion resistance of the Al—Fe alloy layer is dependent on the aluminum concentration in the alloy layer.

An alloying state therefore exists that is preferable for securing post-painting corrosion resistance and the alloying state is determined by the deposition amount of the plating and the heating condition.

In the hot pressing method of the embodiment, an average temperature rising rate until the temperature of the Al-plated steel sheet 10 reaches from 50° C. to a temperature 10° C. lower than the maximum reaching temperature can be set to 10° C./sec to 300° C./sec. The productivity of the Al-plated steel sheet 10 is affected by the average temperature rising rate. However, a general average temperature rising rate is about 5° C./sec in a case of atmospheric heating at a high temperature. An average temperature rising rate of 100° C./sec or higher can be achieved by electrical heating or high frequency induction heating.

When the aforementioned high average temperature rising rate is realized, productivity is improved. In addition, the average temperature rising rate affects the composition and the thickness of the Al—Fe alloy layer and is thus an important factor of controlling product quality. In case of the Al-plated steel sheet 10 of the embodiment, since the temperature rising rate can increase to 300° C./sec, productivity is improved and product quality can be controlled over a broader range.

Regarding heating before hot pressing, the heating needs to be performed in the austenite region based on the principle of hot pressing. The peak temperature (maximum reaching temperature) in the heating is generally 900° C. to 950° C. Although the maximum reaching temperature is not particularly limited in the hot pressing method of the embodiment, a temperature of lower than 850° C. is not preferable since sufficient hardness cannot be obtained. In addition, the Al plating layer 12 needs to change to an Al—Fe alloy layer, and thus, a temperature of lower than 850° C. is not preferable.

When the heating temperature is higher than 1000° C., the alloying advances excessively, the iron concentration in the Al—Fe alloy layer increases to cause deterioration in post-painting corrosion resistance. Although nothing absolute can be said, the post-painting corrosion resistance is dependent on the temperature rising rate and the deposition amount of the Al plating layer 12, and thus, heating at a temperature of higher than 1000° C. is not desirable in terms of economic efficiency.

As described above, in the Al-plated steel sheet 10 according to the first embodiment, the surface coating layer 13 containing zinc oxide and the lubricity improving compound including the transition metal element is formed on the surface of the Al plating layer 12, and thus, more satisfactory lubricity can be obtained than that of the conventional one and improvement of formability and productivity can be realized during hot pressing.

Further, in the Al-plated steel sheet 10 according to the first embodiment, improvement of chemical conversion properties after hot pressing and post-painting corrosion resistance can be realized.

The reason why the chemical conversion properties are improved by the formation of the surface coating layer 13 (the adherence of the chemical conversion coating is improved) is not clear. However, the chemical conversion reaction progresses with an acid-etch reaction toward the substrate acting as a trigger, the zinc oxide contained in the surface coating layer 13 is an amphoteric compound that dissolves in an acid. Accordingly, it is considered that the reason why the chemical conversion properties are improved is that the zinc oxide contained in the surface coating layer 13 easily reacts with a chemical conversion solution.

Further, the Al-plated steel sheet 10 according to the embodiment can be formed into machine parts having various shapes by the application of the aforementioned hot pressing method and is particularly suitable for producing an automotive part which requires weight reduction, high rigidity, and high corrosion resistance. Examples of the automotive part include a door impact beam, a bumper beam, and press-formed parts such as a center pillar reinforcing material.

Figure 2:
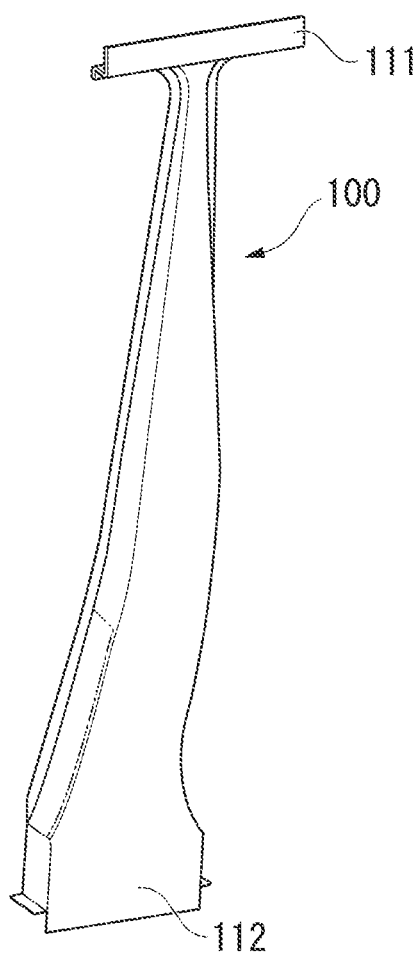
FIG. 2 is an external view showing a center pillar reinforcing material as an example of an automotive part of the present invention.

FIG. 2 is an external view showing a center pillar reinforcing material as an example of an automotive part. As shown in FIG. 2, a center pillar reinforcing material 100 is an automotive part formed into a vertically long shape as seen from a plan view, an upper end 111 is fixed to a roof side rail of an automobile, and a lower end 112 is fixed to a sill of a lower portion of the automobile. The collision safety of automobiles can be improved by forming the Al-plated steel sheet 10 of the embodiment to produce the center pillar reinforcing material 100.

Second Embodiment

Figure 1B:
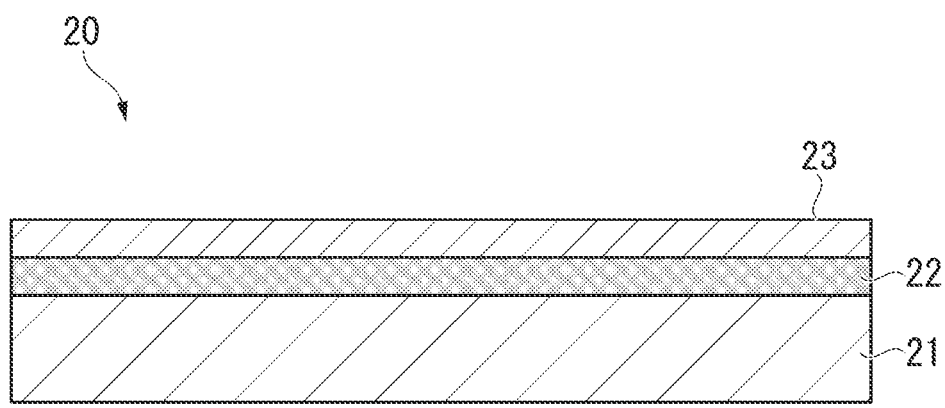
FIG. 1B is a layer structure view of an Al-plated steel sheet according to a second embodiment of the present invention.

Next, a second embodiment of the present invention will be described. FIG. 1B is a view showing a layer structure of an Al-plated steel sheet 20 according to the second embodiment. As shown in FIG. 1B, the Al-plated steel sheet 20 according to the second embodiment includes a steel sheet 21, an Al plating layer 22 which is formed on one surface (for example, an upper surface) of the steel sheet 21, and a surface coating layer 23 which is formed on the surface of the Al plating layer 22.

In FIG. 1B, a case in which the Al plating layer 22 and the surface coating layer 23 are formed on one surface of the steel sheet 21 is shown, but the Al plating layer 22 and the surface coating layer 23 may be formed on both surfaces of the steel sheet 21.

The steel sheet 21 is a substrate of the Al-plated steel sheet 20 and has required mechanical properties (tensile strength, yield point, elongation, reduction, hardness, impact value, fatigue strength, creep strength, and other such properties related to mechanical deformation and fracture). For example, the steel sheet 21 contains, by mass %, 0.1% to 0.4% of carbon (C), 0.01% to 0.6% of silicon (Si), 0.5% to 3% of manganese (Mn), 0.01% to 0.1% of titanium (Ti), 0.0001% to 0.1% of boron (B), and a balance consisting of iron (Fe) and unavoidable impurities.

Hereinafter, the role of each of the aforementioned elements contained in the steel sheet 21 will be described. In the following description, "%" refers to mass %.

Carbon is an element for securing the mechanical strength of the steel sheet 21. When the carbon content in the steel sheet 21 is less than 0.1%, sufficient mechanical strength cannot be obtained. On the other hand, when the carbon content in the steel sheet 21 is more than 0.4%, the hardness (mechanical strength) of the steel sheet 21 increases, but melting cracks are easily generated in the steel sheet 21. Accordingly, the carbon content in the steel sheet 21 is desirably 0.1% to 0.4%.

Silicon is an element for securing the mechanical strength of the steel sheet 21, similar to carbon. When the silicon content in the steel sheet 21 is less than 0.01%, strength improving effect cannot be exhibited and sufficient mechanical strength cannot be obtained. On the other hand, silicon is also an easily oxidizable element, and thus, when the silicon content in the steel sheet 21 is more than 0.6%, wettability deteriorates during hot-dip Al plating of the steel sheet 21 and unplating occurs. Accordingly, the silicon content in the steel sheet 21 is desirably 0.01% to 0.6%.

Manganese is an element for increasing the hardenability of the steel sheet 21 to increase the strength of the steel sheet 21. In addition, manganese combines with sulfur (S) which is an unavoidable impurity in the steel sheet 21 to form manganese sulfide (MnS) and prevents hot embrittlement of the steel sheet 21 by sulfur. When the manganese content in the steel sheet 21 is less than 0.5%, the addition effect is not exhibited. On the other hand, when the manganese content in the steel sheet 21 is more than 3%, residual $\gamma$ phase in the steel sheet 21 increases and the strength decreases. Accordingly, the manganese content in the steel sheet 21 is desirably 0.5% to 3%.

Titanium is a strength strengthening element and also an element for improving the heat resistance of the Al plating layer 22. When the titanium content in the steel sheet 21 is less than 0.01%, a strength improving effect and oxidation resistance improving effect cannot be obtained. On the other hand, when the titanium content in the steel sheet 21 is more than 0.1%, for example, carbides and nitrides are formed and the steel sheet 21 is likely to be softened. Thus, the desired mechanical strength cannot be obtained. Accordingly, the titanium content in the steel sheet 21 is desirably 0.01% to 0.1%.

Boron is an element for increasing the hardenability of the steel sheet 21 to improve the strength of the steel sheet 21. When the boron content in the steel sheet 21 is less than 0.0001%, a strength improving effect cannot be exhibited. On the other hand, when the boron content in the steel sheet 21 is more than 0.1%, the fatigue strength of the steel sheet 21 decreases owing to formation of inclusions. Accordingly, the boron content in the steel sheet 21 is desirably 0.0001% to 0.1%.

The steel sheet 21 may contain unavoidable impurities mixed in other production processes within a range not impairing the mechanical strength of the steel sheet 21.

In the steel sheet 21 having the above component composition, the mechanical strength is increased to about 1500 MPa or more by quenching in the hot pressing method. In the hot pressing method, since the steel sheet 21 is press-formed in a state in which the steel sheet is softened, forming is easy. In addition, when the steel sheet 21 is made thin to reduce the weight, high mechanical strength is maintained.

The Al plating layer 22 is formed on one surface (for example, an upper surface) of the steel sheet 21 and contains at least 85% or more of aluminum (Al) by mass %. For example, the Al plating layer 22 is desirably formed by a hot-dip plating method. However, the forming method thereof is not limited to the hot-dip plating method.

As described above, the Al plating layer 22 preferably contains 85% or more of aluminum and may contain components other than aluminum. Components other than aluminum are not particularly limited, but silicon is preferable for the following reasons.

Silicon is an element having a function of suppressing formation of an alloy layer of iron and aluminum (hereinafter, referred to as a Fe—Al alloy layer) during the hot-dip plating of the steel sheet 21. When the silicon content of the Al plating layer 22 is less than 3%, the Fe—Al alloy layer grows thickly during the hot-dip plating of the steel sheet 21, and thus, cracking of the plating layer is facilitated during the process and corrosion resistance may deteriorate. On the other hand, when the silicon content of the Al plating layer 22 is more than 15%, the workability and the corrosion resistance of the Al plating layer 22 deteriorate. Thus, the silicon content of the Al plating layer 22 is desirably 3% to 15%.

The Al plating layer 22 having the above component composition has a function of preventing corrosion of the steel sheet 21 and preventing scales (oxides of iron) from being formed on the surface of the steel sheet 21 due to heating before hot pressing.

Accordingly, a scale removing process, a surface cleaning process, a surface treating process, and the like can be omitted by forming the Al plating layer 22 on the steel sheet 21, and thus, the productivity of the Al-plated steel sheet 20 is improved. In addition, the Al plating layer 22 has a higher melting point than those of coatings made of organic materials and coatings made of other metal materials (for example, Zn-based material) and thus can be processed at a high temperature during hot pressing.

Some of aluminum contained in the Al plating layer 22 is alloyed with iron in the steel sheet 21 during the hot-dip plating or the hot pressing. Accordingly, the Al plating layer 22 is not necessarily formed with a single layer with a fixed component composition and may include a partially alloyed layer (an alloy layer).

Further, when the deposition amount of the Al plating layer 22 with respect to the steel sheet 21 is 80 g/m$^2$ per surface, the thickness of the Al plating layer 22 per surface is about 15 μm.

The surface coating layer 23 is laminated on the surface of the Al plating layer 22 and is a surface coating layer containing at least zinc oxide (ZnO). For example, the surface coating layer 23 is formed on the surface of the Al plating layer 22 by applying a solution in which fine zinc oxide particles are suspended to the surface of the Al plating layer 22 by a roll coater or the like. The surface coating layer 23 has an effect of improving lubricity during the hot pressing of the Al-plated steel sheet 20 and reactivity with a chemical conversion solution.

The surface coating layer 23 further contains one or more lubricity improving compounds, in addition to the aforementioned zinc oxide. In the first embodiment, a compound including the transition metal element is used as a lubricity improving compound. However, in the second embodiment, as a lubricity improving compound, a compound including one or more typical elements (elements belonging to the first group and the second group and the twelfth group to the eighteenth group in the periodic table) having a temperature rising property improving effect (temperature rising rate improving effect) of the Al-plated steel sheet 20 during heating, in addition to a lubricity improving effect, is used.

Particularly, the aforementioned typical element is preferably any one or more of magnesium (Mg), calcium (Ca), strontium (Sr), barium (Ba), phosphorus (P), tin (Sn), and germanium (Ge).

Compounds of these typical elements are desirably oxides, and for example, magnesia, calcia, or the like is preferable. It is considered that these compounds have high emissivity and effectively absorb heat in the heating furnace. Particularly, when an emitting body emitting far-infrared rays is used in the heating furnace, the temperature properties are significantly improved. The reason thereof is assumed that the oxide including zinc oxide has high emissivity with respect to a wavelength of a far-infrared region.

For example, the surface coating layer 23 including zinc oxide and the compound of the aforementioned typical element (lubricity improving compound) is formed on the surface of the Al plating layer 22 by applying a coating containing zinc oxide and the lubricity improving compound to the surface of the Al plating layer, and baking and drying the coating after applying the coating.

As a method for applying zinc oxide and the lubricity improving compound, for example, a method of forming a coating by mixing a suspension containing zinc oxide and the lubricity improving compound containing the typical metal element with an organic binder, and applying the coating to the surface of the Al plating layer 22, and a method of application by powder coating can be used.

As the lubricity improving compound including the aforementioned typical element, for example, magnesia (MgO), calcia (CaO), forsterite ($Mg_2SiO_4$), or the like is preferably used. Further, as the organic binder, for example, polyurethane resins, polyester resins, acrylic resins, silane coupling agents, or the like are preferably used. The aforementioned lubricity improving compound and organic binder are preferably aqueous to be mixed with the suspension containing zinc oxide respectively. In this manner, the coating obtained by mixing the suspension containing zinc oxide and the lubricity improving compound and the organic binder is applied to the surface of the Al-plated steel sheet 22.

The particle size of zinc oxide is not particularly limited and the diameter thereof is desirably 50 nm to 1000 nm. The particle size of zinc oxide is a particle size after heat treatment is performed. Specifically, the particle size of zinc oxide is determined by observing the zinc oxide with a SEM or the like after zinc oxide is retained in a furnace at 900° C. for 5 minutes to 6 minutes and rapidly cooled with a die.

The particle size of the lubricity improving compound including the typical element in the surface coating layer 23 is not particularly limited. However, the particle size thereof is desirably the same as the particle size of zinc oxide.

The amount of the lubricity improving compound including the typical element in the surface coating layer 23 is preferably 3% to 35% with respect to the total amount of zinc oxide by mass ratio. When the amount of the lubricity improving compound is less than 3%, a sufficient temperature rising property improving effect (temperature rising rate improving effect) cannot be obtained in the heating furnace. On the other hand, when the amount of the lubricity improving compound is more than 35%, reactivity with a chemical conversion solution is easily impaired after heating.

The amount of the organic binder (organic compound) such as a resin component or a silane coupling agent in the surface coating layer 23 is desirably 5% to 30% with respect to the total amount of zinc oxide by mass ratio. When the amount of the organic binder is less than 5%, a sufficient binder effect cannot be obtained and the coating before heating is easily exfoliated. In order to stably obtain the binder effect, the amount of the organic binder is preferably 10% or more with respect to the total amount of zinc oxide by mass ratio. When the amount of the organic binder is more than 30%, odor emission becomes significant during heating, and thus, the amount of more than 30% is not preferable.

The present inventors have confirmed that the surface coating layer 23 according to the embodiment has higher lubricity compared to an inorganic compound coating containing at least one of silicon, zirconium, titanium, and phosphorus described in Patent Document 2, an organic compound coating, or a complex compound coating thereof. Thus, according to the Al-plated steel sheet 20 of the embodiment, more satisfactory lubricity than that of the conventional one can be achieved and improvement of formability and productivity can be realized during hot pressing.

The surface coating layer 23 preferably contains 0.3 $g/m^2$ to 7 $g/m^2$ of zinc oxide in terms of zinc.

When the amount of zinc oxide is 0.3 $g/m^2$ or more in the surface coating layer 23 in terms of zinc, a lubricity improving effect is exhibited. On the other hand, when the amount of zinc oxide in the surface coating layer 23 is more than 7 $g/m^2$ in terms of zinc, the thicknesses of the Al plating layer 22 and the surface coating layer 23 are increased and thus, weldability and coating adhesion deteriorate.

Accordingly, the amount of zinc oxide in the surface coating layer 23 is desirably 0.3 $g/m^2$ to 7 $g/m^2$ on one surface of the surface coating layer 23 in terms of zinc. From the viewpoint of securing lubricity during the hot pressing and further securing satisfactory weldability and coating adhesion, the amount of zinc oxide in the surface coating layer 13 is particularly desirably 0.5 $g/m^2$ to 2 $g/m^2$.

As a method for baking and drying the coating containing zinc oxide, the lubricity improving compound, and the organic binder after the applying of the coating, for example, a method using an hot air furnace, an induction heating furnace, a near-infrared furnace, or the like, or a method in which these furnaces are combined may be used. Depending on the type of the organic binder, instead of baking and drying after the applying of the coating, a curing method using ultraviolet rays or electron beams may be adopted. The method for forming the surface coating layer 23 is not limited to the above method and various coating forming methods can be adopted.

When the organic binder is not used, the surface coating layer 23 has slightly low adhesion with the Al plating layer 22 before heating and partially exfoliated when being rubbed with great force. In this manner, since the surface coating layer 23 of the Al-plated steel sheet 20 exhibits satisfactory lubricity during hot pressing, the formability of the Al-plated steel sheet 20 is improved during the hot pressing and the corrosion resistance of the Al-plated steel sheet 20 after the hot pressing is also improved.

In addition, the surface coating layer 23 of the Al-plated steel sheet 20 has an effect of suppressing adhesion of the Al-plated steel sheet 20 to a die. If the Al plating layer 22 is powdered, the surface coating layer 23 containing zinc oxide on the surface prevents adhesion of powder (Al—Fe powder or the like) to the following die. Thus, a process of removing the Al—Fe alloy powder adhering to the die is not required and thus, productivity is improved.

The surface coating layer 23 functions as a protective coating for preventing scratches of the steel sheet 21 and/or the Al plating layer 22 or the like from being generating during hot pressing, and thus, the formability of the Al-plated steel sheet 20 is further improved. Further, the surface coating layer 23 has an effect of suppressing deterioration in the spot weldability of the Al-plated steel sheet 20 and the coating adhesion or the like. By forming the chemical conversion coating on the Al-plated steel sheet 20, the post-painting corrosion resistance of the Al-plated steel sheet 20 is significantly improved, and thus, the deposition amount of the surface coating layer 23 can be reduced. As a result, when the Al-plated steel sheet 20 is rapidly pressed, the adhesion of the Al—Fe alloy powder exfoliated from the Al-plated steel sheet 20 to the die is suppressed and productivity is further improved.

When the deposition amount of the surface coating layer 23 with respect to the steel sheet 21 (Al plating layer 22) is 1 $g/m^2$ in terms of Zn, the thickness of the surface coating layer 23 is about 0.5 μm.

The Al-plated steel sheet 20 of the embodiment can be processed and formed by various methods but is suitable for forming by a hot pressing method. Hereinafter, a method for hot-pressing the Al-plated steel sheet 20 in the embodiment will be described.

In the method for hot-pressing the Al-plated steel sheet 20, first, the Al-plated steel sheet 20 is blanked and then, heated and softened. The softened Al-plated steel sheet 20 is press-formed into a desired shape, and then, cooled. Since the Al-plated steel sheet 20 is softened once, the following press forming can be easily performed. Then, the Al-plated steel sheet 20 is quenched by heating and cooling to obtain a steel sheet having high mechanical strength of 1500 MPa or more.

As a heating method in the hot pressing method, typical heating methods using an electric furnace, a radiant tube furnace, infrared rays, or the like can be adopted. When the Al-plated steel sheet 20 is heated to the melting point of aluminum or higher, the Al plating layer 22 is melted and aluminum and iron diffuse mutually to form an alloy layer of aluminum and iron (Al—Fe alloy layer) or an alloy layer of aluminum, iron, and silicon (Al—Fe—Si alloy layer). Both the Al—Fe alloy layer and Al—Fe—Si alloy layer respectively have a high melting point and the melting point is about 1150° C.

In the Al-plated steel sheet 20, plural compounds which form the Al—Fe alloy layer and the Al—Fe—Si alloy layer are present. However, these compounds change to compounds having high iron concentration by heating these compounds at a high temperature or heating these compounds for a long period of time. A final product of the Al-plated steel sheet 20 desirably has a surface state in which alloying extends to the surface and the iron concentration is not high in the alloy layer.

When aluminum which is not alloyed remains, only a portion in which aluminum remains is rapidly corroded and thus, the coating easily blisters after painting. Conversely, even when the iron concentration becomes excessively high in the alloy layer, the corrosion resistance of the alloy layer itself deteriorates, and the coating easily blisters after painting. The reason is that the corrosion resistance of the alloy layer is dependent on the aluminum concentration in the alloy layer.

An alloying state therefore exists that is preferable for securing post-painting corrosion resistance and the alloying state is determined by the deposition amount of the plating and the heating condition.

In the hot pressing method of the embodiment, an average temperature rising rate until the temperature of the Al-plated steel sheet 20 reaches from 50° C. to a temperature 10° C. lower than the maximum reaching temperature can be set to 10° C./sec to 300° C./sec. The productivity of the Al-plated steel sheet 20 is affected by the average temperature rising rate. However, a general average temperature rising rate is about 5° C./sec in a case of atmospheric heating at a high temperature. An average temperature rising rate of 100° C./sec or higher can be achieved by electrical heating or high frequency induction heating.

When the aforementioned high average temperature rising rate is realized, productivity is improved. In addition, the average temperature rising rate affects the composition and the thickness of the alloy layer and is thus an important factor controlling product quality. In case of the Al-plated steel sheet 20 of the embodiment, since the temperature rising rate can increase to 300° C./sec, productivity is improved and product quality can be controlled over a broader range.

Regarding heating before hot pressing, the heating needs to be performed in the austenite region based on the principle of hot pressing. The peak temperature (maximum reaching temperature) in the heating is generally 900° C. to 950° C. Although the maximum reaching temperature is not particularly limited in the hot pressing method of the embodiment, a temperature of lower than 850° C. is not preferable since sufficient hardness cannot be obtained. In addition, the Al plating layer 22 needs to change to an alloy layer, and thus, a temperature of lower than 850° C. is not preferable.

When the heating temperature is higher than 1000° C., the alloying advances excessively, the iron concentration in the alloy layer increases to cause deterioration in post-painting corrosion resistance. Although nothing absolute can be said, the post-painting corrosion resistance is dependent on the temperature rising rate and the deposition amount of the Al plating layer 22, and thus, heating at a temperature of 1100° C. or higher is not desirable in terms of economic efficiency.

As described above, in the Al-plated steel sheet 20 according to the second embodiment, the surface coating layer 23 containing zinc oxide and the lubricant compound including the typical element is formed on the surface of the Al plating layer 22, and thus, more satisfactory lubricity can be obtained than that of the conventional one and improvement of formability and productivity can be realized during hot pressing.

In addition, according to the Al-plated steel sheet 20 of the second embodiment, improvement of chemical conversion properties after hot pressing and post-painting corrosion resistance can be realized.

Further, according to the Al-plated steel sheet 2Q of the second embodiment, in addition to the aforementioned effect, a temperature rising property improving effect (temperature rising rate improving effect) during heating can be obtained.

The Al-plated steel sheet 20 according to the second embodiment can be formed into machine parts having various shapes by the application of the aforementioned hot pressing method, similar to the first embodiment, and is particularly suitable for producing an automotive part which requires weight reduction, high rigidity, and high corrosion resistance (for example, a door impact beam, a bumper beam, and press-formed parts such as a center pillar reinforcing material).

EXAMPLES

Although examples of the present invention will be described below, conditions employed in the examples are merely one condition example employed so as to confirm the operability and effect of the present invention, and the present invention is not limited to the one condition example. The present invention can employ various conditions as long as the object of the present invention is achieved without departing from the scope of the present invention.

Example 1

A cold-rolled steel sheet having the component composition shown in Table 1 (1.4 mm thickness) was plated with Al by the Sendzimir method. The annealing temperature was set to about 800° C., and the Al plating bath contained 85% or more of Al and 9% of Si % by mass % and additionally, contained Fe eluted from the steel sheet.

TABLE 1

| | | | | | | | (mass %) |
|---|---|---|---|---|---|---|---|
| C | Si | Mn | P | S | Ti | B | Al |
| 0.21 | 0.11 | 1.22 | 0.007 | 0.002 | 0.02 | 0.003 | 0.03 |

After the steel sheet was hot-dip plated, the deposition amount of the plating was adjusted to 160 g/m² on both surfaces of the steel sheet by the gas wiping method. The steel sheet in which the Al plating layer was formed in this manner was cooled, and then, a coating treatment solution shown in Tables 2 and 3 (the continuation of Table 2) was applied to the surface of the Al plating layer with a roll coater and baked at about 80° C. Thus, a surface coating layer including zinc oxide and the lubricity improving compound (particularly, the compound of the transition metal element described in the first embodiment) was formed. All coating treatment solutions shown in Tables 2 and 3 were suspensions or aqueous solutions in which a reagent and distilled water are mixed.

The properties of the steel sheet in which the Al plating layer and the surface coating layer including the compound of the transition metal element were formed in this manner (that is, the Al-plated steel sheet corresponding to the first embodiment: hereinafter, referred to as a first Al-plated steel sheet) were evaluated in the following methods.

(1) Hot Lubricity

Figure 3:
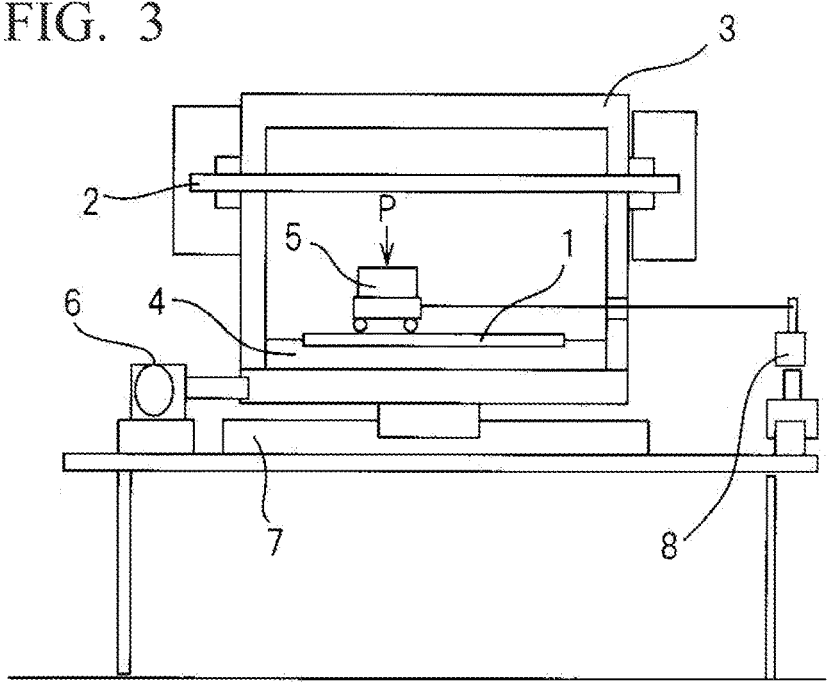
FIG. 3 is a view showing a form of an apparatus for evaluating hot lubricity of the Al-plated steel sheet.

The hot lubricity of the first Al-plated steel sheet was evaluated using the apparatus shown in FIG. 3. A test piece 1 having a size of 150 mm×200 mm collected from the first Al-plated steel sheet was placed on a test piece stand 4 of a furnace 3 provided on the upper portion of a heater 2, and then, the test piece 1 was heated to 900° C. Then, in a state in which a load P (pressing load) was applied to the test piece 1 using a load applying apparatus 5 under the temperature condition of about 700° C., the furnace 3 was driven by a furnace driving apparatus 6 along a ball way 7 to measure the drawing load of the test piece 1.

The drawing load of the test piece 1 was measured by a load cell 8 connected to the load applying apparatus 5. A dynamic friction coefficient was calculated by dividing the drawing load by the pressing load.

(2) Coating Adhesion after Heating

A test piece collected from the first Al-plated steel sheet was placed in an atmospheric furnace and was heated at 900° C. for 6 minutes. Then, the test piece was taken out from the atmospheric furnace, immediately clamped by a stainless steel die, and rapidly cooled. The temperature rising rate of the test piece was about 5° C./sec, and the cooling rate was about 150° C./sec. Next, the test piece was cut to have a size of 50 mm×50 mm and was provided for a rubbing test. In the rubbing test, a gauze was rubbed on the surface of the test piece 10 times with a load of 1.5 kgf within a width of 30 mm, and the Zn deposition amounts of the gauze before and after the test were measured to calculate the reduction rate (%) of Zn.

(3) Strength of Spot Welded Joint

A test piece collected from the first Al-plated steel sheet was placed in the atmospheric furnace and was heated at 900° C. for 6 minutes. Then, the test piece was taken out from the atmospheric furnace, immediately clamped by a stainless steel die, and rapidly cooled. The temperature rising rate of the test piece was about 5° C./sec, and the cooling rate was about 150° C./sec. Next, the cross tensile strength of the test piece was measured according to JIS Z3137 (1990). At this time, the welding conditions are as follows. In the test, an average value of joint strength was calculated by setting the number N of samples of the test piece to 3 and measuring the strength of each of 3 samples.

Electrode: chromium-copper, DR (8 mmϕ tip of 40 R)

Applied pressure: 880 kgf

Energizing duration: up-slope 3 cycles-22 cycles energized (60 Hz)

Weld current: 9.5 kA (4) Post-Painting Corrosion Resistance

A test piece collected from the first Al-plated steel sheet was placed in the atmospheric furnace and was heated at 900° C. for 6 minutes. Then, the test piece was taken out from the atmospheric furnace, immediately clamped by a stainless steel die, and rapidly cooled.

The temperature rising rate of the test piece was about 5° C./sec, and the cooling rate was about 150° C./sec. Next, the test piece was cut to have a size of 70 mm×150 mm and was subjected to chemical conversion using a chemical conversion solution (PB-SX35) manufactured by Nihon Parkerizing Co., Ltd. Then, the test piece was painted with an electrodeposition coating (Powernics 110) manufactured by Nippon Paint Co., Ltd. to have a coating thickness of 20 μm, and baked at 170° C.

The post-painting corrosion resistance of the test piece was evaluated by the method defined by JASO M609 (1991) defined by the Society of Automotive Engineers of Japan. A cutter was used to make a crosscut in the coating in advance, and the width (maximum value on one side) of the coating blister from the crosscut after a corrosion test was performed for 180 cycles (60 days) was measured. As for a comparison example, a galvannealed steel sheet with a deposition amount of 45 g/m² on one surface was evaluated. At this time, the blister width thereof was 7 mm.

Each evaluation result is summarized in Tables 2 and 3 (the continuation of Table 2). In addition, for comparison, a case in which the surface coating layer was not formed was also evaluated in the same manner. The evaluation results are shown in Table 4.

TABLE 2

| No. | Amount of ZnO (g/L) | Compound other than ZnO | Amount of left compound *1 | Amount of binder *2 | Deposition amount *3 | Hot lubricity | Coating adhesion | Strength of spot joint | Post-painting corrosion resistance | |
|---|---|---|---|---|---|---|---|---|---|---|
| 1 | 200 | Nickel sulfate | 10% | 20% | 1 | 0.6 | 10% | 7.5 kN | 1.9 mm | Example |
| 2 | 200 | Nickel nitrate | 10% | 20% | 1 | 0.62 | 9% | 7.3 kN | 2.0 mm | Example |
| 3 | 200 | Manganese sulfate | 10% | 20% | 1 | 0.6 | 8% | 7.6 kN | 2.2 mm | Example |
| 4 | 200 | Copper sulfate | 10% | 20% | 1 | 0.63 | 10% | 7.4 kN | 2.3 mm | Example |
| 5 | 200 | Titanium fluoride | 10% | 20% | 1 | 0.61 | 8% | 7.5 kN | 2.5 mm | Example |
| 6 | 200 | Zirconium nitrate | 10% | 20% | 1 | 0.62 | 10% | 7.4 kN | 2.7 mm | Example |
| 7 | 200 | Nickel sulfate | 10% | 20% | 0.4 | 0.75 | 9% | 7.6 kN | 2.9 mm | Example |
| 8 | 200 | Nickel sulfate | 10% | 20% | 0.8 | 0.65 | 10% | 7.5 kN | 2.5 mm | Example |
| 9 | 200 | Nickel sulfate | 10% | 20% | 1.2 | 0.62 | 7% | 7.6 kN | 2.1 mm | Example |
| 10 | 200 | Nickel sulfate | 10% | 20% | 2.3 | 0.60 | 9% | 7.2 kN | 2.5 mm | Example |
| 11 | 200 | Nickel sulfate | 10% | 20% | 3 | 0.59 | 10% | 6.7 kN | 1.8 mm | Example |
| 12 | 200 | Nickel sulfate | 10% | 20% | 6.5 | 0.58 | 15% | 4.1 kN | 1.2 mm | Example |
| 13 | 200 | Nickel sulfate | 10% | 20% | 7.7 | 0.60 | 34% | 3.8 kN | 1.1 mm | Example |
| 14 | 200 | Nickel sulfate | 10% | 3% | 1 | 0.63 | 10% | 7.6 kN | 2.1 mm | Example |
| 15 | 200 | Nickel sulfate | 10% | 7% | 1 | 0.62 | 8% | 7.5 kN | 2.0 mm | Example |

*1: Ratio with respect to amount of ZnO
*2: Ratio with respect to amount of ZnO
*3: Amount in terms of Zn

TABLE 3

(the continuation of Table 2)

| No. | Amount of ZnO (g/L) | Compound other than ZnO | Amount of left compound *1 | Amount of binder *2 | Deposition amount *3 | Hot lubricity (friction coefficient) | Coating adhesion | Strength of spot welded joint | Post-painting corrosion resistance | |
|---|---|---|---|---|---|---|---|---|---|---|
| 16 | 200 | Nickel sulfate | 10% | 10% | 1 | 0.64 | 8% | 7.5 kN | 2.6 mm | Example |
| 17 | 200 | Nickel sulfate | 10% | 30% | 1 | 0.60 | 8% | 7.4 kN | 2.6 mm | Example |
| 18 | 200 | Nickel sulfate | 10% | 40% | 1 | 0.62 | 9% | 7.5 kN | 2.7 mm | Example |
| 19 | 200 | Manganese sulfate | 0.5% | 20% | 1 | 0.61 | 10% | 7.6 kN | 1.9 mm | Example |
| 20 | 200 | Manganese sulfate | 3% | 20% | 1 | 0.64 | 7% | 7.5 kN | 2.1 mm | Example |
| 21 | 200 | Manganese sulfate | 20% | 20% | 1 | 0.62 | 9% | 7.3 kN | 2.6 mm | Example |
| 22 | 200 | Manganese sulfate | 35% | 20% | 1 | 0.63 | 8% | 7.3 kN | 2.2 mm | Example |
| 23 | 200 | Manganese sulfate | 50% | 20% | 1 | 0.61 | 8% | 7.5 kN | 2.1 mm | Example |
| 24 | 200 | No compound contained | — | 20% | 0.5 | 0.83 | 9% | 7.5 kN | 2.5 mm | Comparative Example |
| 25 | 200 | No compound contained | — | 20% | 1.2 | 0.72 | 7% | 7.3 kN | 2.0 mm | Comparative Example |
| 26 | 200 | No compound contained | — | 20% | 1.6 | 0.67 | 9% | 7.4 kN | 2.0 mm | Comparative Example |
| 27 | 200 | No compound contained | — | 20% | 2 | 0.64 | 7% | 7.2 kN | 2.5 mm | Comparative Example |
| 28 | 200 | No compound contained | — | 20% | 3.1 | 0.60 | 10% | 6.5 kN | 1.3 mm | Comparative Example |
| 29 | 200 | No compound contained | — | 20% | 5 | 0.60 | 14% | 5.3 kN | 1.0 mm | Comparative Example |

*1: Ratio with respect to amount of ZnO
*2: Ratio with respect to amount of ZnO
*3: Amount in terms of Zn

TABLE 4

| Hot lubricity | Coating adhesion | Strength of spot welded joint | Post-painting corrosion resistance |
|---|---|---|---|
| 0.95 | — | 7.3 kA | 6.5 mm |

The hot lubricity indicates the measured dynamic friction coefficient, the coating adhesion indicates Zn exfoliation rates before and after the test, the spot joint strength indicates the cross tensile strength, and the post-painting corrosion resistance indicates the maximum blister width on one surface from the crosscut. Examples (Nos. 1 to 23 in Tables 2 and 3) having the surface coating layer containing ZnO exhibit improved hot lubricity compared to Comparative Examples (Nos. 24 to 29 in Table 3) in which the surface coating layer is not formed.

However, if the deposition amount of the surface coating layer is relatively small, sufficient hot lubricity cannot be obtained. When the deposition amount of the surface coating layer is large, the strength of the spot joint, particularly, the cross tensile strength, decreases. A decrease in the strength of the spot joint and decrease in the cross tensile strength are not desirable in terms of stability of automotive part quality. The reason why the strength of the spot joint decreases when the deposition amount of the surface coating layer is large is not clear. However, there is a possibility that oxides may remain in a welding nugget and stress may be concentrated on the portion in which the oxides remain during drawing.

Contrarily, the surface coating layer (Nos. 7 to 13 in Table 2) including a compound of one or two or more transition metal elements (particularly, Ti, V, Cr, Mn, Fe, Co, Ni, Cu, Zr, Mo, W, La, and Ce) exhibits excellent hot lubricity in a region with a small deposition amount, and when the amount is 2 $g/m^2$ or less in terms of Zn, a decrease in the strength of the spot joint can be suppressed.

Although whether the aforementioned compound affects post-painting corrosion resistance is not clear, compared to the steel sheets without the surface coating layer, all steel sheets exhibit excellent post-painting corrosion resistance. This is because the chemical conversion properties are improved.

Figure 5:
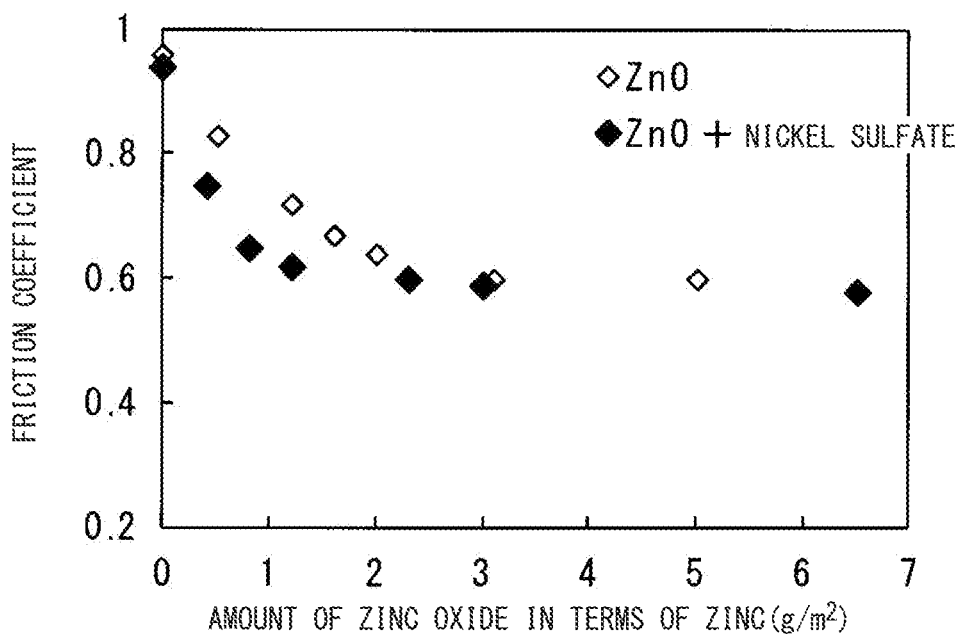
FIG. 5 is a view showing a relationship between a zinc oxide content (amount of zinc oxide in terms of Zn) of a surface coating layer and hot lubricity (friction coefficient).
Figure 6:
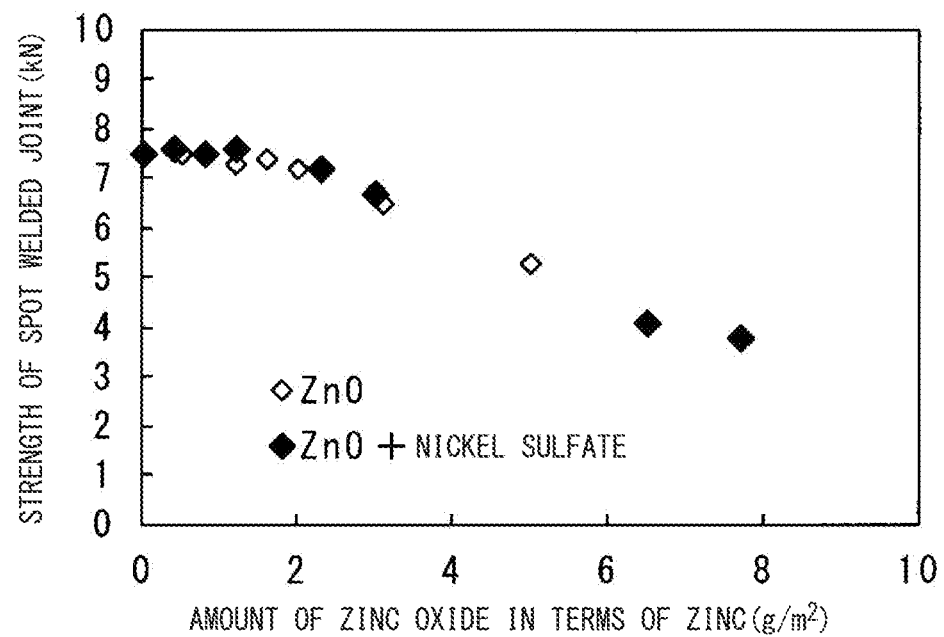
FIG. 6 is a view showing a relationship between a zinc oxide content (amount of zinc oxide in terms of Zn) of a surface coating layer and strength of a spot joint.

The influence of the deposition amount of the surface coating layer on the properties was investigated. For Nos. 7 to 13 in Table 2 (Examples), Nos. 24 to 29 in Table 3 (Comparative Examples), and a case in which the surface coating layer is not formed of Table 4, the coating exfoliation rate, the hot lubricity (friction coefficient), and the strength of the spot joint are respectively shown in FIGS. 4, 5, and 6.

Compared to a system not including a compound of one or two or more transition metal elements (particularly, Ti, V, Cr, Mn, Fe, Co, Ni, Cu, Zr, Mo, W, La, and Ce), a system including these compounds exhibits improved hot lubricity with a smaller deposition amount.

When the deposition amount of the surface coating layer increases, the strength of the spot welded joint and the coating adhesion decrease. It is found that in order to increase the strength of the spot welded joint, the deposition amount of the surface coating layer is preferably 2 $g/m^2$ or less (refer to FIG. 6), and in order to increase the coating adhesion, the deposition amount is preferably 7 $g/m^2$ or less (refer to FIG. 4).

Example 2

The test piece 1 of Example 1 was rapidly heated with near-infrared rays. The temperature rising rate was set to 21° C./sec. The quenching of the test piece was performed in the same manner as in Example 1, and the following evaluation was also performed in the same manner as in Example 1. The evaluation results are shown in Table 5. It was found that although the post-painting corrosion resistance was improved, there was no change in properties other than the post-painting corrosion resistance. From the results, it is possible to expect further improvement in the properties by rapid heating.

TABLE 5

| Hot lubricity | Coating adhesion | Strength of spot welded joint | Post-painting corrosion resistance |
|---|---|---|---|
| 0.62 | 8% | 7.3 kA | 1.2 mm |

Example 3

An aqueous solution in which 20% of urethane resin was added to ZnO was used as a base, and 10% of sodium vanadate, sodium dichromate, ferrous sulfate, cobalt chloride, sodium molybdate, sodium tungstate, cerium nitrate were added to the solution.

1 $g/m^2$ of the thus-prepared treatment solution in terms of Zn was applied to the first Al-plated steel sheet used in Example 1, and the hot lubricity was measured by the methods described in Example 1. As a result, a numerical value in a range of 0.60 to 0.65 was obtained in all the methods. Thus, it is found that all of the aforementioned compounds contribute to improving hot lubricity.

Example 4

A cold-rolled steel sheet having the component composition shown in Table 6 (1.4 mm thickness) was plated with Al by the Sendzimir method. The annealing temperature was set to about 800° C., and the Al plating bath contained 85% or more of Al and 9% of Si % by mass % and additionally, contained Fe eluted from the steel sheet.

TABLE 6

| | | | | | | | (mass %) |
|---|---|---|---|---|---|---|---|
| C | Si | Mn | P | S | Ti | B | Al |
| 0.22 | 0.13 | 1.20 | 0.005 | 0.002 | 0.02 | 0.004 | 0.03 |

After the steel sheet was hot-dip plated, the deposition amount of the plating was adjusted to 160 $g/m^2$ on both surfaces of the steel sheet by the gas wiping method. The steel sheet in which the Al plating layer was formed in this manner was cooled, and then, a coating treatment solution shown in Table 7 was applied to the surface of the Al plating layer with a roll coater and baked at about 80° C. Thus, a surface coating layer including zinc oxide and the lubricity improving compound (particularly, the compound of the typical element described in the second embodiment) was formed. All coating treatment solutions shown in Table 7 were suspensions or aqueous solutions in which a reagent and distilled water are mixed.

As described above, the properties of the steel sheet including the Al plating layer and the surface coating layer containing the compound of the typical element (that is, corresponding to the Al-plated steel sheet of the second embodiment: hereinafter, referred to as a second Al-plated steel sheet) were evaluated by the following methods.

(1) Hot Lubricity

The hot lubricity of the second Al-plated steel sheet was evaluated using the apparatus shown in FIG. 3. A test piece 1 having a size of 150 mm×200 mm collected from the second Al-plated steel sheet was placed on a test piece stand 4 of a furnace 3 provided on the upper portion of a heater 2, and then, the test piece 1 was heated to 900° C. Then, in a state in which a load P (pressing load) was applied to the test piece 1 using a load applying apparatus 5 under the temperature condition of about 700° C., the furnace 3 was driven by a furnace driving apparatus 6 along a ball way 7 to measure the drawing load of the test piece 1. The drawing load of the test piece 1 was measured by a load cell 8 connected to the load applying apparatus 5. A dynamic friction coefficient was calculated by dividing the drawing load by the pressing load.

(2) Temperature Rising Properties During Heating

After a thermocouple was welded to a test piece having a size of 70 mm×150 mm collected from the second Al-plated steel sheet, the test piece was placed in an atmospheric furnace with a temperature set to 900° C., and a time until the temperature of the test piece reached from 50° C. to 890° C. was measured to calculate an average temperature rising rate.

(3) Strength of Spot Welded Joint

A test piece collected from the second Al-plated steel sheet was placed in the atmospheric furnace and was heated at 900° C. for 6 minutes. Then, the test piece was taken out from the atmospheric furnace, immediately clamped by a stainless steel die, and rapidly cooled. The cooling rate of the test piece was about 150° C./sec. Next, the cross tensile strength of the test piece was measured according to JIS Z3137. At this time, the welding conditions are as follows. In the test, an average value of joint strength was calculated by setting the number of samples of the test piece to 3 and measuring the strength of each of 3 samples.

Electrode: chromium-copper, DR (8 mmφ tip of 40 R)

Applied pressure: 880 kgf

Energizing duration: up-slope 3 cycles-22 cycles energized (60 Hz)

Weld current: 9.5 kA (4) Post-Painting Corrosion Resistance

A test piece collected from the second Al-plated steel sheet was placed in the atmospheric furnace and was heated at 900° C. for 6 minutes. Then, the test piece was taken out from the atmospheric furnace, immediately clamped by a stainless steel die, and rapidly cooled. The cooling rate of the test piece was about 150° C./sec. Next, the test piece was cut to have a size of 70 mm×150 mm and was subjected to chemical conversion using a chemical conversion solution (PB-SX35) manufactured by Nihon Parkerizing Co., Ltd. Then, the test piece was painted with an electrodeposition coating (Powernics 110) manufactured by Nippon Paint Co., Ltd. to have a thickness of 20 μm, and baked at 170° C.

The post-painting corrosion resistance of the test piece was evaluated by the method defined by JASO M609 defined by the Society of Automotive Engineers of Japan. A cutter was used to make a crosscut in the coating in advance, and the width (maximum value on one side) of the coating blister from the crosscut after a corrosion test was performed for 180 cycles (60 days) was measured. As a comparison material, a galvannealed steel sheet with a deposition amount of 45 g/m² on one surface was evaluated. At this time, the blister width thereof was 7 mm.

Each evaluation result is summarized in Table 7. In addition, for comparison, a case in which the surface coating layer was not formed was also evaluated in the same manner. The evaluation results are shown in Table 8.

TABLE 7

| No. | Amount of ZnO (g/L) | Compound other than ZnO | Amount of left compound *1 | Amount of binder *2 | Deposition amount *3 | Hot lubricity | Temperature rising rate (° C./s) | Strength of spot welded joint (kN) | Post-painting corrosion resistance (mm) | |
|---|---|---|---|---|---|---|---|---|---|---|
| 1 | 200 | MgO | 10% | 20% | 2 | 0.62 | 8.2 | 7.3 | 1.9 | Example |
| 2 | 200 | CaO | 10% | 20% | 2 | 0.64 | 8.1 | 7.2 | 1.9 | Example |
| 3 | 200 | SrO | 10% | 20% | 2 | 0.63 | 8.2 | 7.3 | 2.0 | Example |
| 4 | 200 | BaO | 10% | 20% | 2 | 0.62 | 8.3 | 7.4 | 1.9 | Example |
| 5 | 200 | $Zn_3(PO_4)_2$ | 10% | 20% | 2 | 0.61 | 8.2 | 7.2 | 2.1 | Example |
| 6 | 200 | $SnO_2$ | 10% | 20% | 2 | 0.60 | 8.1 | 7.4 | 2.2 | Example |
| 7 | 200 | $GeO_2$ | 10% | 20% | 2 | 0.63 | 8.3 | 7.3 | 1.9 | Example |
| 8 | 200 | No compound contained | — | 20% | 2 | 0.62 | 4.6 | 7.4 | 2.0 | Comparative Example |
| 9 | 200 | MgO | 10% | 20% | 0.4 | 0.83 | 5.8 | 7.2 | 2.0 | Example |
| 10 | 200 | MgO | 10% | 20% | 0.7 | 0.76 | 6.9 | 7.1 | 1.8 | Example |
| 11 | 200 | MgO | 10% | 20% | 1.5 | 0.67 | 8.0 | 7.3 | 2.0 | Example |
| 12 | 200 | MgO | 10% | 20% | 3.1 | 0.60 | 8.5 | 7.1 | 1.7 | Example |
| 13 | 200 | MgO | 10% | 20% | 5.6 | 0.61 | 8.7 | 6.7 | 1.3 | Example |
| 14 | 200 | MgO | 10% | 20% | 7.7 | 0.60 | 8.8 | 6.2 | 1.0 | Example |
| 15 | 200 | CaO | 3% | 20% | 2 | 0.63 | 5.2 | 7.2 | 1.9 | Example |
| 16 | 200 | CaO | 7% | 20% | 2 | 0.61 | 6.6 | 7.3 | 2.0 | Example |
| 17 | 200 | CaO | 20% | 20% | 2 | 0.60 | 8.7 | 7.1 | 2.7 | Example |
| 18 | 200 | CaO | 35% | 20% | 2 | 0.61 | 9.2 | 7.0 | 4.1 | Example |

*1: Ratio with respect to amount of ZnO
*2: Ratio with respect to amount of ZnO
*3: Amount in terms of Zn

TABLE 8

| Hot lubricity | Temperature rising rate | Strength of spot joint | Post-painting corrosion resistance |
|---|---|---|---|
| 0.93 | 4.5° C./s | 7.4 kA | 6.8 mm |

The hot lubricity indicates the measured dynamic friction coefficient, the temperature rising rate indicates a value obtained by measuring a temperature rising rate, the strength of the spot welded joint indicates the cross tensile strength, and the post-painting corrosion resistance indicates the maximum blister width on one side from the crosscut. Examples (refer to Table 7) having the surface coating layer containing ZnO exhibit improved hot lubricity and post-painting corrosion resistance compared to Comparative Examples (refer to Table 8) in which the surface coating layer is not formed.

On the other hand, regarding the temperature rising rate, it is found that Examples (Nos. 1 to 7 in Table 7) containing a compound of one or two or more typical elements (particularly, Mg, Ca, Sr, Ba, P, Sn, and Ge) have excellent temperature rising properties compared to steel sheets without the surface coating layer or Comparative Example (No. 8 in Table 7) in which the surface coating layer was only composed of ZnO and a binder.

Nos. 9 to 14 in Table 7 are Examples in which the deposition amount of the surface coating layer is changed, and Nos. 15 to 18 are Examples in which the amount of the Ca compound in the surface coating layer is changed. It is found that when the surface coating layer is thin, the hot lubricity is lightly low, and when the surface coating layer is thick, the strength of the spot welded joint slightly decreases. Further, it is also found that when the amount of the Ca compound is small, the temperature rising rate is slightly low, and when the amount of the Ca compound is large, the post-painting corrosion resistance slightly deteriorates.

Example 5

Test pieces Nos. 1 to 8 in Example 4 were heated with far-infrared rays. At this time, a furnace having a temperature rising furnace and a holding furnace was used and the movement between the furnaces was performed manually. While the temperature of the temperature rising furnace was set to 1150° C. and the temperature of the holding furnace was set to 900° C., a thermocouple was welded to each test piece having a size of 70 mm×150 mm. When the temperature of the test piece reached 850° C. in the temperature rising furnace, the test piece was moved to the holding furnace.

Similar to Example 4, an average temperature rising rate was calculated at 50° C. to 890° C. Quenching was performed in the same manner as in Example 4 and the evaluation after the quenching was also performed in the same manner as in Example 4. The evaluation results are shown in Table 9. When the temperature rising rate was high, it was recognized that the post-painting corrosion resistance was improved. A higher temperature rising rate was obtained in No. 1 compared to No. 8.

TABLE 9

| No. | Hot lubricity | Temperature rising rate (° C./s) | Strength of spot welded joint | Post-painting corrosion resistance |
|---|---|---|---|---|
| 1 | 0.61 | 25° C./s | 7.2 kA | 1.2 mm |
| 8 | 0.61 | 14° C./s | 7.3 kA | 1.0 mm |

Example 6

To an aqueous solution in which 20% of urethane resin was added to ZnO, and 1) 5% of MgO and CaO were respectively added, 2) 5% of CaO and SrO were respectively added, and 3) 5% of $SnO_2$ and $GeO_2$ were respectively added to prepare a treatment solution. 2 g/m² of the treatment solution in terms of Zn was applied to the second Al-plated steel sheet used in Example 4, and the temperature rising rate was measured by the methods described in Example 4. As a result, the temperature rising rate in a range of 8° C./sec to 8.5° C./sec was obtained in all the methods. As seen from the result, it is found that all of the aforementioned compounds contribute to improving hot lubricity.

INDUSTRIAL APPLICABILITY

According to the present invention, it is possible to improve formability and productivity in the hot pressing by securing the lubricity of the Al plating layer in the hot pressing of the Al-plated steel sheet. Further, according to the present invention, it is possible to improve the chemical conversion properties of the Al-plated steel sheet after the hot pressing, the post-painting corrosion resistance of the Al-plated steel sheet, and the temperature rising properties of the Al-plated steel sheet in a heating furnace. Thus, the present invention expands the range of application to hot pressing of the Al-plated steel sheet and enhances the applicability of the Al-plated steel sheet to the automobiles and industrial equipment that are the final applications, and thus, the industrial applicability is high.

BRIEF DESCRIPTION OF THE REFERENCE SYMBOLS 10, 20: Al-plated steel sheet
11, 21: Steel sheet
12, 22: Al plating layer
13, 23: Surface coating layer
1: Test piece
2: Heater
3: Furnace
4: Test piece stand
5: Load applying apparatus
6: Furnace driving apparatus
7: Ball way
8: Load cell

The invention claimed is:

1. An Al-plated steel sheet comprising:
a steel sheet;
an Al plating layer which is formed on one surface or both surfaces of the steel sheet and contains at least 85% or more of Al by mass %; and
a surface coating layer which is coated on the surface of the Al plating layer,
wherein:
the surface coating layer, formed on one surface of the steel sheet, contains 0.3 g/m² to 7 g/m² of ZnO in terms of Zn, and contains a lubricity improving compound including one or more transition metal elements selected from the group consisting of Ti, Mn, Ni, Cu and Zr,
said lubricity improving compound is a sulfated compound, a fluoride compound, or a nitric acid compound, and
an amount of said lubricity improving compound is 0.5% to 50% with respect to a total amount of ZnO by mass ratio.

2. The Al-plated steel sheet according to claim 1,
wherein the amount of said lubricity improving compound including the transition metal element in the surface coating layer is 1% to 40% with respect to the total amount of ZnO by mass ratio.

3. A method for hot-pressing an Al-plated steel sheet comprising:
blanking and then heating the Al-plated steel sheet according to claim 1; and
press-forming the steel sheet.

4. The method for hot-pressing an Al-plated steel sheet according to claim 3,
wherein an average temperature rising rate until the temperature of the Al-plated steel sheet reaches from 50° C. to a temperature 10° C. lower than a maximum reaching temperature is 10° C./sec to 300° C./sec in the heating before the press-forming of the steel sheet.

5. The method for hot-pressing an Al-plated steel sheet according to claim 4,
wherein the heating before the press-forming of the steel sheet is performed by electrical heating or induction heating.

6. An automotive part produced by the method for hot-pressing an Al-plated steel sheet according to claim 3.

7. An Al-plated steel sheet comprising:
a steel sheet;
an Al plating layer which is formed on one surface or both surfaces of the steel sheet and contains at least 85% or more of Al by mass %; and
a surface coating layer which is coated on the surface of the Al plating layer,
wherein:
the surface coating layer, formed on one surface of the steel sheet, contains 0.3 $g/m^2$ to 7 $g/m^2$ of ZnO in terms of Zn, and contains a lubricity improving compound including one or more typical elements selected from the group consisting of Mg, Sr, Sn and Ge,
the lubricity improving compound is an oxide, and
an amount of said oxide is 3% to 35% with respect to a total amount of ZnO by mass ratio.

8. The Al-plated steel sheet according to claim 7,
wherein the amount of the oxide is 5% to 30% with respect to the total amount of ZnO by mass ratio.

* * * * *